Oct. 22, 1968     E. B. WEBER     3,406,979

REINFORCED O-RING

Filed Feb. 19, 1965     2 Sheets-Sheet 1

INVENTOR.
EUGENE B. WEBER
BY Nathan N. Kallman
ATTORNEY

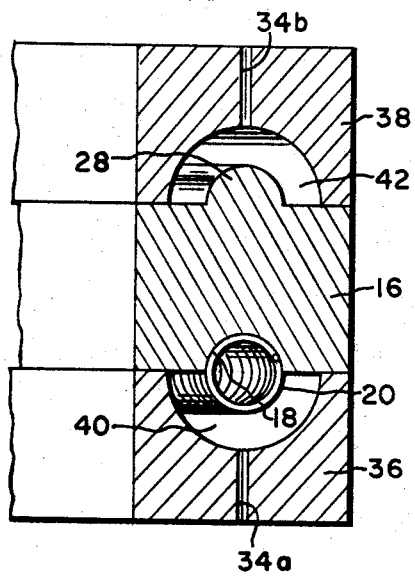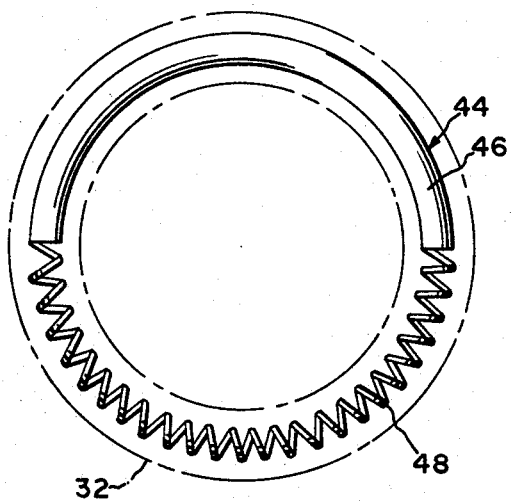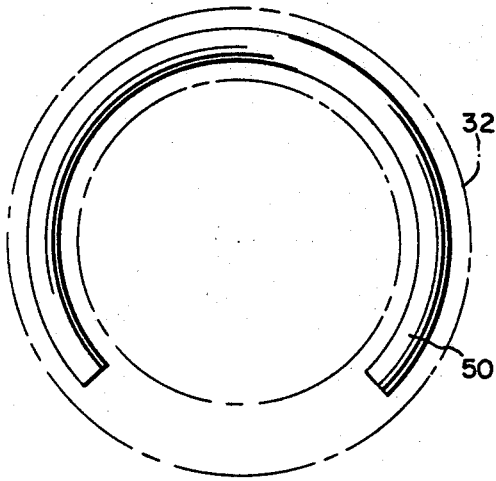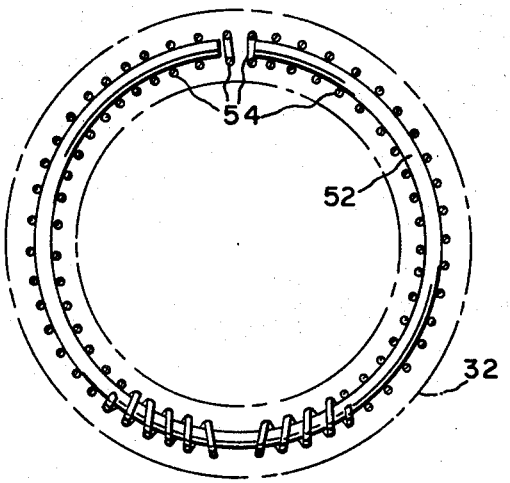

United States Patent Office 3,406,979
Patented Oct. 22, 1968

3,406,979
REINFORCED O-RING
Eugene B. Weber, San Jose, Calif., assignor of one-half to California Fruit Concentrates, Inc., a corporation of California
Filed Feb. 19, 1965, Ser. No. 433,938
3 Claims. (Cl. 277—80)

ABSTRACT OF THE DISCLOSURE

An O-ring seal is made with a reinforcing element concentrically disposed within an elastomer, by using magnetic elements for securing the assembly parts during manufacture.

---

This invention relates to novel and improved O-ring seals or gaskets and to a method and means of constructing same.

O-ring seals, which are generally used in apparatus for control of fluid and pneumatic pressure, are subject to wear by mechanical vibration, pressure, friction from fluid flow, temperature variations and the like. Thus, frequent replacement of seals is necessary with resultant loss in operating time of the equipment and expensive labor costs. Also, leakage resulting from one or more of the above factors, such as leakage from a natural gas pipeline valve or from an in-flight airliner, could result in a serious hazardous condition to personnel.

Heretofore, it has been proposed to use O-rings made from elastomers with a reinforcing element, such as a spring core. However, with some known methods of construction, wherein the reinforcing element or spring contacts the outer periphery of a seal, damage could result, especially in the cases of reciprocating, oscillating and rotating opposing sealing surfaces. Furthermore, it is well known that O-ring seals operate in accordance with the principle of controlled deformation. Some slight deformation is experienced by the elastic O-ring in the form of diametral squeeze when it is installed. For a detailed description of O-ring operation, reference is made to "Machine Design," June 11, 1964, a Penton Publication, particularly the article on p. 59 by M. H. Everett and H. G. Gillette. Any significant squeeze of an O-ring with an internal spring in direct contact with the outer periphery of an O-ring will result in damage of the opposing sealing surface. Also, with known methods of construction, the reinforcing core is not precisely centered with relation to the annular geometry, or the cross-sectional area, or both, thereby introducing asymmetry in the O-ring. As a result, the O-ring seal is subjected to uneven pressures and accelerated wear. Apparently this leads to more frequent replacement with its attendant costs.

An object of this invention is to provide novel and improved methods and means for construction of O-ring seals.

Another object of this invention is to provide an O-ring seal that has a concentrically positioned reinforcing part therein for greatly increasing the lifetime of such seal.

According to this invention, an elastomer O-ring is made with an annular reinforcing element that is positioned concentrically by means of a set of three dies or mold sections. The base die has an annular groove therein for accommodating one half section of slice of the elastomer ring; whereas the top die has a similar mirror image groove for accommodating the second half-section of the ring. The middle die or mold section has an annular ramp on one surface or face, and an annular groove on the opposite surface. This latter groove in the middle die seats the reinforcing element, which is retained in fixed position by magnetic force. In this manner, during mating of the base die containing one section of the elastomer ring, and the middle die that secures the reinforcing element, there is a substantially precise central positioning of the element within the elastomer half-section. At the same time, the ramp of the middle die forms an annular depression in the second elastomer section, which will match or conform to the configuration of the reinforcing element. Thereafter, the middle die is removed and the two half sections are joined with the reinforcing element encompassed in concentric relationship to the formed O-ring.

According to this invention, the reinforcing element may be an endless helical spring; or a helical spring surrounding a flexible rod in an annular configuration; or a solid flexible rod covering between 180° to 355° of an annulus, but preferably about 270°. In another embodiment which can serve as a gate valve, the reinforcing element may be eccentrically positioned relative to the cross-sectional area of the elastomer ring, although concentrically disposed relative to the annular geometry of the ring itself.

The invention will be described in greater detail with reference to the drawing, in which:

FIGURE 5 is a fragmentary cross-sectional view of a set of injection molds, such as may be used to accomplish this invention;

FIGURES 6, 7 and 8 are plan views of alternative embodiments of O-ring seals, made in accordance with this invention.

Similar numerals refer to similar elements throughout the drawing.

Figure 1:
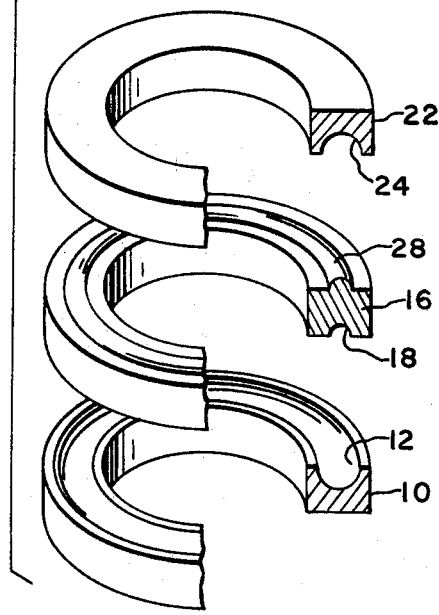
FIGURE 1 is an exploded perspective view, partly broken away, of a set of molds which may be used in accordance with this invention.
Figure 2:
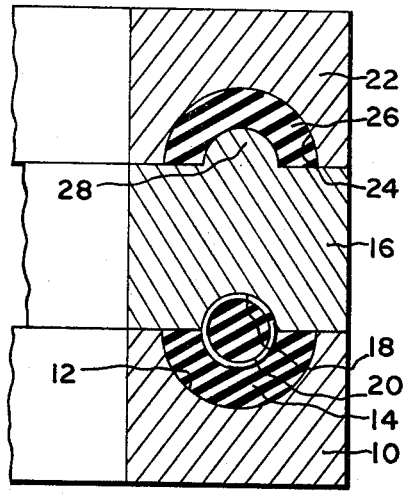
FIGURE 2 is a fragmentary cross-sectional view of the three molds of FIGURE 1, showing one step of the compression process.

With reference to FIGURES 1 and 2, a set of molds or dies that are used for forming the O-ring seals of this invention are shown, partly cut away. The molds are formed from hard steel, and may be four inches in diameter and about one-half inch in thickness, by way of example. The bottom die or mold section 10 has an annular groove 12 therein which serves to seat the lower half 14 of the O-ring seal, which has been preformed. The material used for the seal may be an elastomer, such as commercially available Viton A–HV made by E. I. du Pont de Nemours & Co., or Fluorel made by Minnesota Mining and Manufacturing Co.; or other common elastomers, such as neoprene or Bunda N. The middle die or mold section 16 is formed with an annular groove 18 which is dimensioned to receive a reinforcing element 20, such as a flexible steel spring. In accordance with one feature of this invention, the middle mold section 16 is made of permanent magnet material so that the metallic element 20 may be securely held within the groove 18 during the mold compression process.

The reinforcing element 20 may be magnetized to provide the desired magnetic attraction between the mold section 16 and the element 20. A magnetic powder dispersed in a liquid adhesive may be applied to the element 20 to provide magnetic holding force between the element 20 and the mold 16. Also, bar magnets may be positioned equidistantly around the mold adjacent to the groove 18 to retain the element in an immobile condition. Alternatively, the elastomer 14 may be formed with magnetically charged particles, and the mold section 10 may be made of permanent magnet material. Similarly the top die 22 which has an annular groove 24, substantially the same as the groove 12 is found in the base mold 10, may be a permanent magnet to maintain an upper half-section of elastomer 26 in a fixed position during the compression process. Also, one or more of the molds may be electromagnets, energizable by a power supply when desired.

In accordance with another feature of this invention, the middle mold 16 has an annular protrusion or ramp 28 formed on the opposite surface than the groove 18. It should be noted that the ramp 28 defines substantially the same volume and shape as the groove 18, whereby the ramp and groove are complementary.

During manufacture by the compression method, the preformed nonvulcanized elastomer half-sections 14 and 26 and the reinforcing element 20 are positioned within their respective grooves 12, 24 and 18 in the molds. Preforms may be made by one of two methods. The first utilizes an extrusion method whereby unvulcanized elastomer stock is extruded in a semicircular configuration and spliced end to end to fit grooves 12 and 24 in a complete 360° circle. The splice is removed during the final vulcanization process.

The second method involves the stamping out of the preform with a cutting die from a sheet of unvulcanized elastomer stock which has been milled to the proper thickness. The rough dimensions of the preform will be suited for cavities 12 and 24.

Figure 4:
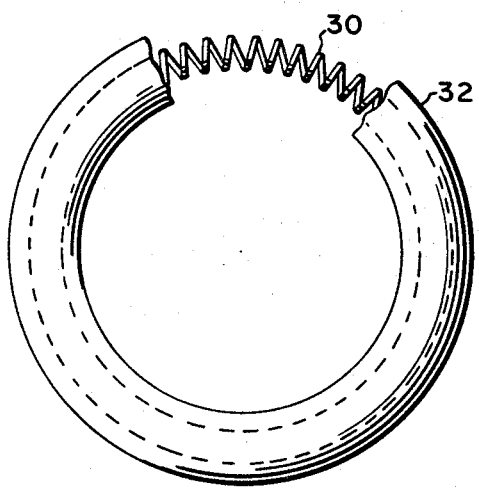
FIGURE 4 is a plan view of an O-ring seal, partly broken away, illustrating a product of the invention.

The molds are brought together by means of a hydraulic press under a pressure of 5000 lbs. for about 30 seconds. It should be noted that during this compression step, all the parts to be worked are retained rigidly in a fixed position so that there is virtually no displacement of the parts. The molds are kept in alignment by guide pins or clamps (not shown) during the compression process. The temperature during this stage is maintained at about 110° F. so that the elastomer will not be vulcanized or cured. Flash cavities located on each side of grooves 12 and 24 (not shown), will receive the excess unvulcanized stock. The unvulcanized elastomer in the groove 24 assumes a configuration determined by the groove 24 and the ramp 28, as seen in FIGURE 2. Simultaneously, if a helical spring 30 as illustrated in FIGURE 4 is utilized as a reinforcing element, the elastomer fills the spaces between the helices of the spring. On the other hand, if a solid or closed reinforcing element is employed as shown in FIGURE 7 for example, then the elastomer surrounds the lower half portion of the reinforcing element. In any event, the elastomer section 14 and the reinforcing element 20 are joined.

Figure 3:
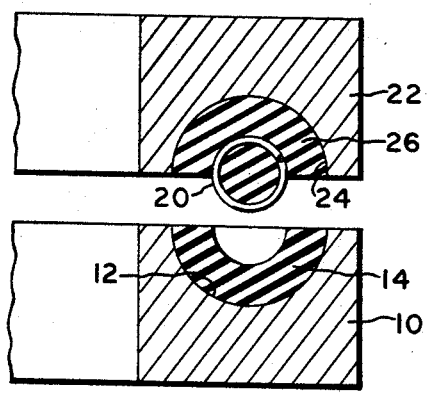
FIGURE 3 is a fragmentary cross-sectional view of two of such molds, illustrating another step in the compression process.

The next stage of the process utilizes only the bottom and top molds 10 and 22 respectively, after removal of the middle die 16 which has served its purpose. As depicted in FIGURE 3, the unvulcanized elastomeric preform containing the spring element 20 is then placed into die 22 and held in place by magnetic force, and in effect resists gravitational forces. Dies 10 and 22 are compressed under 5000 lbs. load while the formed half section 26 and the joined half section 14 and element 20 are maintained in position by magnetic force. The molds 10 and 22 are aligned by guide pins or clamps, in a well known manner, in the hydraulic press. The molds are generally aligned relative to a center guide point.

The temperature of the molds 10 and 22 is raised to the curing temperature of the elastomer preforms 14 and 26, which may be 300° F., by means of heated platens or heating elements so that the two separate elastomeric preforms 14 and 26 are polymerized into one integral homogenous elastomeric unit evenly distributed around and in the spring element 20. This temperature is maintained for about 30 minutes to effect the vulcanization or polymerization reaction. At this temperature, the reinforcing element 20 permeates and joins with the upper half section 26. Thereafter, the joined parts 14, 20, and 26, forming a reinforced composite O-ring according to this invention, are postcured at approximately 400° F. for about 24 hours. The flash may then be removed from the assembly by any of several well known methods.

An O-ring manufactured in accordance with this invention is illustrated in FIGURE 4, partly broken away. The reinforcing element 20 in this embodiment comprises a spring 30 with helices having a diameter substantially one half that of the outer cross-sectional diameter of the elastomer ring 32. It should be noted that elastomer material is disposed within the helices throughout the ring structure, as shown in FIGURES 2 and 3.

Another method of manufacture employs injection molding, whereby the elastomer is introduced through a series of ports 34a and 34b formed in the base mold 36 and top mold 38 respectively. The middle mold 16 remains substantially the same as that used in the compression process.

The reinforcing element 20 is positioned and magnetically retained in the groove 18 of the middle mold 16, and the three molds are held together securely by aligning clamps or guide pins. Thereafter, the elastomer which has been heated to about 150° so that it is substantially viscous is forced through the ports under high pressure via nozzles to the annular grooves 40 and 42 formed in the outer molds. By way of example, four ports of about .05 inch in diameter, each spaced 90° apart and disposed in both the top and bottom molds 38 and 36, are used, and equal injection pressure is applied to each port simultaneously. During the injection process, the back pressure at the ports is measured by an externally located meter so that injection may be halted when the grooves and ports are filled with elastomer. In this manner, the lower and upper half sections of the O-ring are formed, the lower section 14 having the reinforcing element 20 joined thereto.

The O-ring of this invention may be .210 inch in cross-section, having an outer diameter of 1⅞ inches and an inner diameter of 1½ inches. If a helical spring is used as the reinforcing element, as in FIGURE 4, the spring may be .022 gauge wire, having 19 turns per linear inch with a cross-section of about 0.1 inch. The spring may be a garter type, with tapered ends that thread into a connector spring to form a circular loop. The spring may be made from flexible steel and magnetized, or coated with a magnetic material.

Since the spring or element 20 is magnetically secured during the compression process, dislocation of the spring is prevented thus ensuring precise centering within the elastomer annulus. Also damage and deterioration of the molds are avoided since there is no displacement of the metallic reinforcing elements during compression. Such displacements generally would occur with relatively large springs if not adequately maintained in rigid position.

The elastomer may be a magnetic rubber material, or a rubber containing magnetic particles such as ferrites or ferric oxide. When used in hydraulic systems, the magnetic rubber in combination with a magnetic spring or other magnetized embodiment could collect stray ferrous particles that are circulating in the system. Thus, the use of a seal of this type would tend to prevent contamination and increase reliability of certain types of valves, particularly servovalves.

The reinforcing element need not take the form of a spring as shown in FIGURE 4 but may take other forms. For example, the O-ring illustrated in FIGURE 6 incorporates an element 44 that includes a flexible rod 46 traversing 180° of the annulus and a helical spring 48 joined to the rod 46 for completing the circular loop within the O-ring. This construction combines rigidity and elasticity in a single O-ring seal.

FIGURE 7 depicts a ring reinforced by a flexible rod 50 covering about 270° of the annulus. This type construction resists seal blowout during operation of opening and closing of a gate in a gate valve. In FIGURE 8, a combination of a 355° partly circular flexible rod 52 encompassed by a 355° partly circular helical spring 54 is illustrated. The open portions or discontinuities of the rod 52 and the spring 54 are located about 180° apart. Also the helical spring may be 360° around a flexible rod which is circular to about 270° and fits inside of the helical spring. This structure may afford an easier method of construction than FIGURE 6, and be less rigid than the flexible rod in FIGURE 6 because of less cross-sectional area of the rod.

Various types of bonding agents may be used such as Chemlock 607, manufactured by the Lord Manufacturing Company, for securing a greater adhesive bond between the metal and the elastomer for any of the composite seal structures illustrated.

In every case, the reinforcing element is positioned concentrically relative to the annular configuration of the O-ring. The embedded element serves to resist the rolling and extrusion type failures which occur due to conditions of high pressures, temperatures and other factors. The spring allows the seal to be stretched or flexed as is necessary to be installed in a standard O-ring groove or gland. The inventive ring overcomes problems caused by rapid pressure pulsations, elevated temperatures for extended periods of time, high pressure operating conditions, nuclear radiation environments, pneumatic seal rapid depressurization blowup, blowout of seal from valve seat under a high pressure differential, torsional or spiral failure, and extrusion due to cylinder breathing, inter alia. The ring made in accordance with the inventive method affords mass production techniques with resultant economy.

It should be noted that the scope of the invention is not limited to the configuration, sizes or other parameters set forth above. For example, seals of square shape or other geometric form may be fabricated in accordance with the inventive concept. Also, the reinforcing element may be positioned eccentrically relative to the cross-sectional area of the ring although concentric relative to the annular geometry. Such arrangement affords a gate valve with enhanced sealing action.

What is claimed is:
1. An O-ring comprising:
    an annular elastomer;
    an annular reinforcing element disposed concentrically within the elastomer annulus, said element being a helical spring structure having a cross-sectional diameter substantially less than that of said elastomer, wherein said element is magnetic and has a magnetic powder dispersed in liquid adhesive applied thereto.
2. An O-ring comprising:
    an annular elastomer;
    an annular reinforcing element disposed concentrically within the elastomer annulus, said element having a cross-sectional diameter substantially less than that of said elastomer, wherein the reinforcing element comprises a flexible rod encompassed by a helical spring, said rod being discontinuous in one region and said spring being discontinuous in another region.
3. An O-ring as in claim 2, wherein said spring forms a 360° circle, and the rod covers about 270° of such circle.

References Cited
UNITED STATES PATENTS

| | | | |
|---|---|---|---|
| 2,259,242 | 10/1941 | Clark | 264—254 |
| 2,816,784 | 12/1957 | Stocke | 277—152 |
| 2,790,624 | 4/1957 | Lofqvist | 277—152 |
| 2,828,238 | 3/1958 | Batson et al. | 277—235 X |
| 2,940,128 | 6/1960 | Bowerman et al. | 264—254 |
| 3,218,095 | 11/1965 | Wiltse | 277—235 X |
| 2,661,182 | 12/1953 | Kipp. | |
| 3,183,010 | 5/1965 | Bram | 277—235 |
| 3,189,675 | 6/1965 | Moore et al. | |

FOREIGN PATENTS 1,138,633  1/1957  France.

SAMUEL ROTHBERG, *Primary Examiner.*